United States Patent [19]

Ayers et al.

[11] Patent Number: 5,004,259

[45] Date of Patent: Apr. 2, 1991

[54] ROCKING WHEELCHAIR

[75] Inventors: Robert C. Ayers, Burbank; Ted Lee, Playa Del Rey, both of Calif.

[73] Assignee: Rx Rocker Corporation, Newbury Park, Calif.

[21] Appl. No.: 436,755

[22] Filed: Nov. 15, 1989

[51] Int. Cl.⁵ .......................... B62M 1/14; B62J 1/02
[52] U.S. Cl. ............................ 280/304.1; 280/250.1; 297/302; 297/DIG. 4
[58] Field of Search ......................... 280/250.1, 304.1; 180/907; 297/DIG. 4, 300, 302, 303, 270

[56] References Cited

U.S. PATENT DOCUMENTS

| | | | |
|---|---|---|---|
| 2,537,071 | 1/1951 | Lukins | 297/300 |
| 4,125,269 | 11/1978 | Kiel | 297/DIG. 4 |
| 4,544,200 | 10/1985 | Dunn et al. | 297/DIG. 4 |
| 4,641,848 | 2/1987 | Ayers | 280/242 WC |
| 4,786,106 | 11/1988 | Bottemiller | 297/302 |
| 4,889,385 | 12/1989 | Chadwick et al. | 297/302 |

Primary Examiner—Charles A. Marmor
Assistant Examiner—Mitchell Bompey
Attorney, Agent, or Firm—G. Brian Pingel

[57] ABSTRACT

An improved rocking wheelchair formed of a frame, two sets of support wheels for the frame, and a seat portion rockably connected to the frame by a rocking assembly that normally maintains the seat in a generally horizontally alignment when the chair is unoccupied and permits the seat to rock with respect to the frame when the chair is completely stationary.

9 Claims, 3 Drawing Sheets

ROCKING WHEELCHAIR

FIELD OF THE INVENTION

The present invention relates in general to wheelchairs employed to provide transportation for invalids or the aged, and more specifically relates to wheelchairs adapted to provide a rockable seat to enhance the comfort of a user.

DESCRIPTION OF THE PRIOR ART

The present invention is an improved rocking wheelchair that is derived from normal, common day wheelchairs presently being used. Wheelchairs are used by a surprisingly large percentage of people living in the world. They are used not only by the physically handicapped, but also by invalids that, either for reasons of age or other problems, no longer have the ability for walking or at least for walking for any distance.

Common wheelchairs are formed from a frame supported by a large pair of main wheels and a smaller pair of steering caster wheels normally located forwardly of the drive wheels. A seat is fixed with respect to the frame so that a user is provided support while being transported about in the chair. However, such chairs are relatively uncomfortable for long usage, especially for the aged.

U.S. Pat. No. 4,641,848 issued Feb. 10, 1987 to Robert Ayers discloses a form of rocking wheelchair developed to provide a comfortable alternative to existing wheelchairs. The Ayers patent discloses a wheelchair that is somewhat similar in design to existing wheelchairs, but has a rockable seat attached to its frame by pivot connections at each side. Springs are attached to the seat and the frame to serve as bias means to maintain the seat in a generally horizontal alignment when the chair is unoccupied.

Although the Ayers wheelchair provides a comfortable rocking seat, its manufacture requires a great deal of precision which detracts from production of the chair in large volume. The present invention is an improvement over that of the earlier Ayers' wheelchair and provides not only a chair with a rocking seat, but also a chair construction that lends itself to large scale production and yet is durable and relatively simplistic.

Other different wheelchair designs are known in the prior art for providing various specific functions. For example, in U.S. Pat. No. 3,953,054 a 6-wheeled chair is disclosed. The chair is suppose to be more maneuverable and has a seat that can be varied in height and inclination. Also, the patent indicates in an oblique fashion that there is some type of spring suspension associated with the seat that permits to have a rotating action. The chair is designed to be supported by only four of its six wheels at a time and the occupant of the chair can control which wheels will be supporting by leaning back in the seat or leaning forward. Apparently, the spring suspension referred to above is used to facilitate the operator's support wheel control.

Although the "054" patent, as previously described, refers to a spring suspension in use with a seat, the patent in no way shows or describes any structure forming the seat suspension. Obviously the patent is not designed to provide a wheelchair with a rocking seat. If the occupant attempted to rock in the chair, the chair would alternate from being supported by the rear four wheels to the front four wheels in a somewhat jarring fashion that would not only be uncomfortable but would require a relatively large amount of tiring body action.

Another example of an unusual wheelchair construction is shown in U.S. Pat. No. 4,310,167. Such patent discloses a wheelchair with an articulated chassis that permits an operator to change the center of gravity of the chair to vary its stability according to conditions encountered by the operator. Also, the chair includes a shock absorber and spring means that positively maintain a subframe and seat frame assemblies of the chair in a predetermined relationship, but permits the subframe and seat frame assemblies to articulate relative to one another for an increase in comfort when traversing rough ground. It is clear from the disclosure of the "167" patent that it is neither adapted to, nor does it show or describe the use of a wheelchair having a rockable seat.

In U.S. Pat. No. 3,100,638, a baby rocker that has a rockable seat is shown and described. The baby rocker is designed to permit a baby to rock as much as it pleases and to provide a rotating motion of the wheels of the rocker while the seat is rocked to enhance the attraction of the device for the baby. Although the device disclosed has a rockable seat, the patent is obviously directed to a totally different field of art than the wheelchair art, and in no way would lead one skilled in the art to the present invention.

The present invention is adapted to provide an improved rocking wheelchair having a rockable seat that is provided by a rocking assembly for supporting the seat in its relationship to the frame and to maintain the seat portion in a desired alignment when the chair isn't occupied.

SUMMARY OF THE INVENTION

The present invention provides an improved rocking wheelchair that permits a user to rock while seated in the chair. The wheelchair is formed of a frame, two sets of support wheels for the frame, a seat portion, and a rocking assembly for supporting the seat portion in a rockable relationship to the frame.

The frame is formed from opposite, spaced apart rigid side members that are connected together by cross braces. The support wheels for the frame include a pair of main wheels, each of which is connected to one of the frame side members and at least one of which serves as a driving wheel for the chair, and at least one caster wheel pivotally connected to the frame forwardly of the main wheels. The seat portion includes two rigid spaced apart support rails and a support platform attached to and extending between the rails.

Preferably, the rocking assembly is formed from first and second rigid strap means that are attached respectively to the frame and the seat portion, and spring means connected to the straps to normally maintain the seat portion in a desired alignment when the chair is not occupied and to permit the seat to yieldably rock with respect to the frame.

Although the preferred embodiment illustrates a nonmotorized wheelchair, it should be apparent to those skilled in the art the present invention can be employed with all types of wheelchairs, including, but not limited to, motorized, racing and sport version chairs. The invention will appear more clearly from the following detailed description when taken in conjunction with the accompanying drawings showing by way example a preferred embodiment of the inventive idea wherein like numerals refer to like parts throughout.

DETAILED DESCRIPTION OF THE PREFERRED EMBODIMENT

Figure 1:
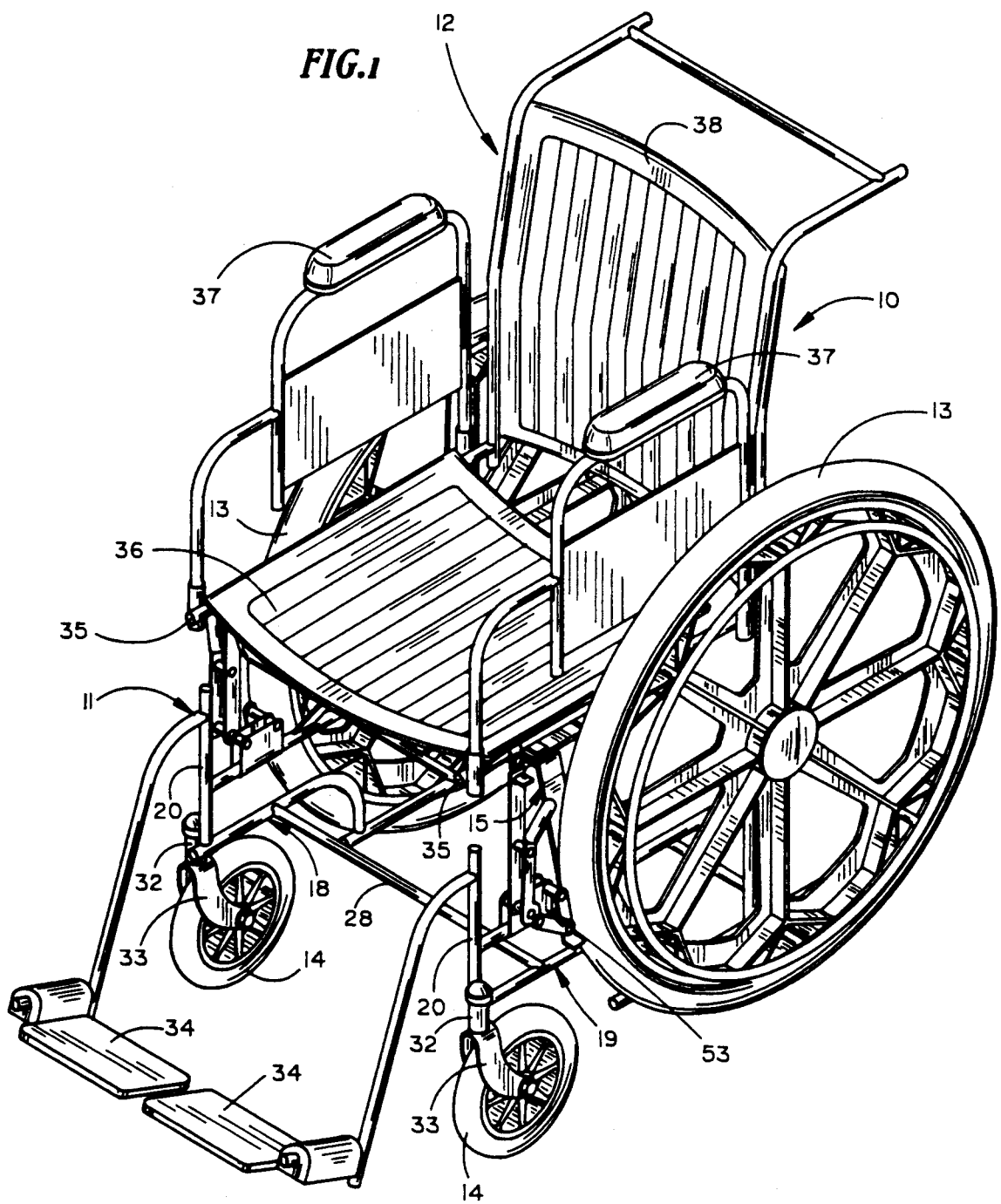
FIG. 1 is a side perspective view of a preferred embodiment of an improved rocking wheelchair of the present invention that includes a frame assembly and a rockable seat portion.
Figure 5:
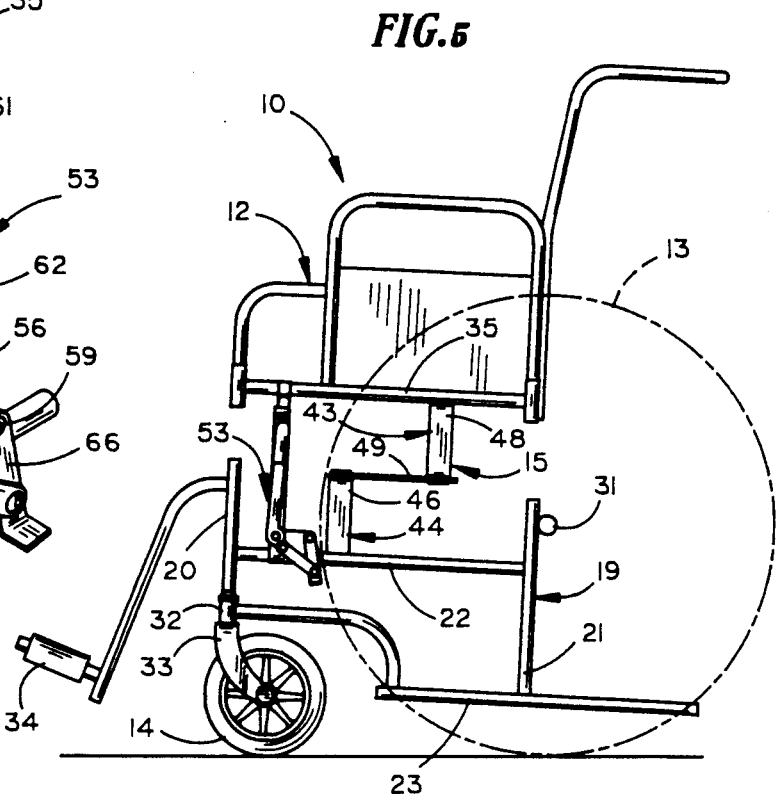
FIG. 5 is a side view of the wheelchair shown in FIG. 1 with the main wheel thereof represented by a dashed line for purposes of clarity.

Referring now to the drawings and with reference first to FIG. 1, a preferred embodiment of an improved rocking wheelchair of the present invention is shown generally at 10. The wheelchair 10 includes a frame assembly 11, a seat assembly 12, a pair of main wheels 13, a pair of caster wheels 14, and a rocking assembly 15, best shown in FIGS. 2, 5 and 7. Preferably, the frame assembly 11 is constructed of high strength, lightweight tubular members to provide a chair that is durable but yet is light enough so that it can be handled relatively easily.

Figure 2:
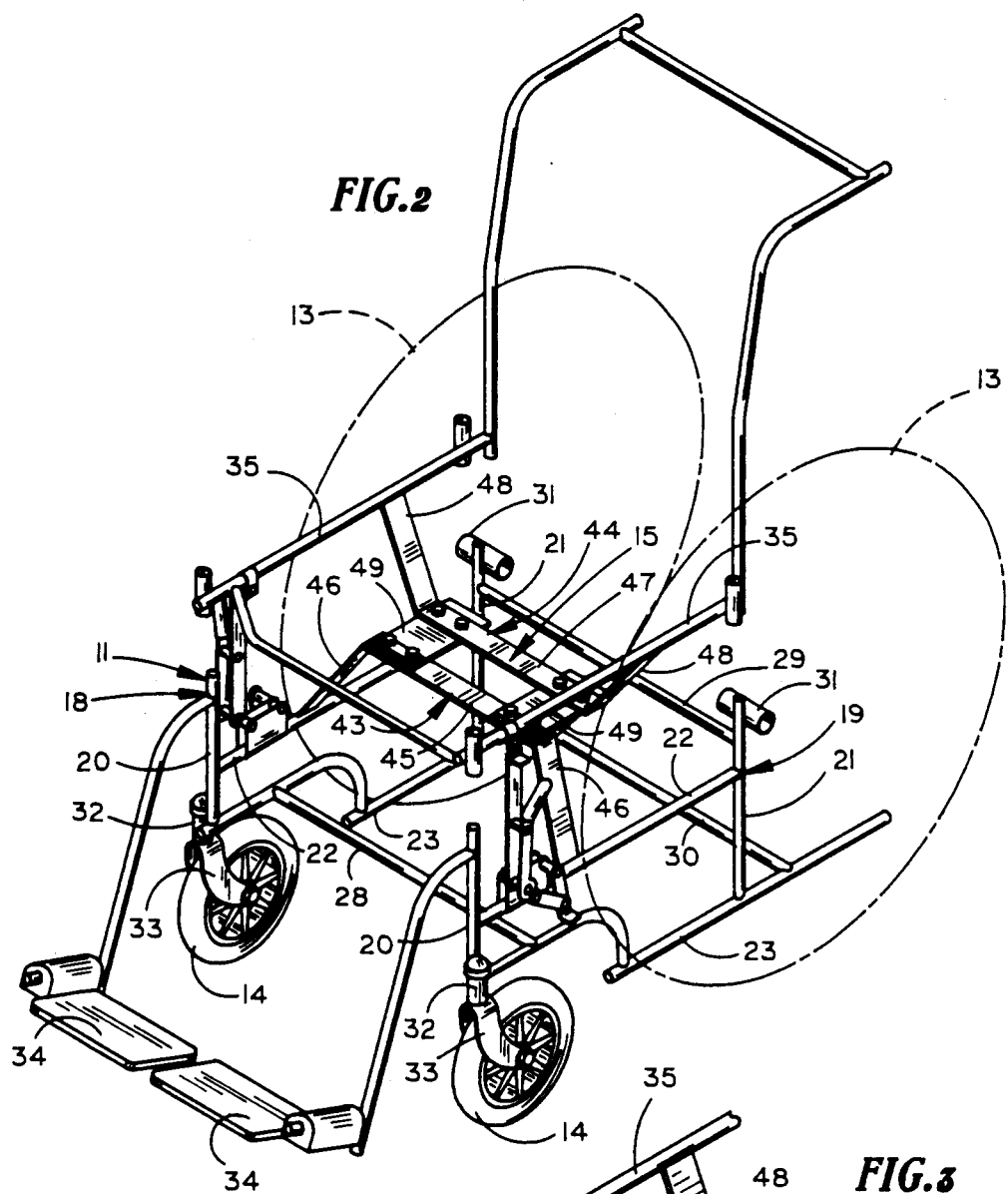
FIG. 2 is a side perspective view of the wheelchair shown in FIG. 1 with the main wheels thereof represented by dashed lines and only the frame of the seat portion shown for purposes of clarity.
Figure 3:
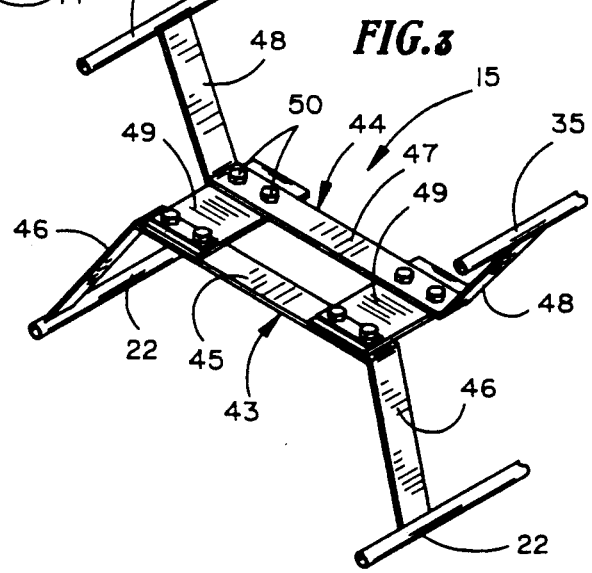
FIG. 3 is an enlarged fragmentary view of a rocking assembly that rockably connects the seat portion to the frame assembly.

The frame assembly 11 is formed of upright side members 18 and 19 that define the sides of the assembly 11. The side members 18 and 19 are generally formed of front and rear upright members 20 and 21, as shown in FIG. 2, and upper and lower horizontal tubular members 22 and 23 respectively joined together in a generally rectangular configuration.

The side frame members 18 and 19 are shown joined together by cross braces 28, 29 and 30. However, such cross brace construction is not essential to the present invention for a variety of cross brace constructions can be employed as alternatives to the braces 28, 29 and 30, as is well known in the art.

Each of the side frame members 18 and 19 journals one of the main wheels 13 via axles 31, and each also provides a downwardly opening vertically aligned pivot socket 32 for mounting the caster wheels 14 forwardly of the main wheels 13. Each of the caster wheels 14 is rotatably attached to an inverted U-shaped yoke 33. Preferably, foot rests 34 are attached in cantilever fashion to the upright tubular members 20 to support the feet and legs of a user.

Referring again to FIG. 1, the seat assembly 12 is extended transversely between the side frame members 18 and 19. The assembly 12 is formed from tubular side support members 35 and a pliable seat member 36 formed of leather, fabric, mylar or the like that is attached to and extends between the support members 35. The seat assembly 12 may also have armrests 37 associated with the side support members 35 and a backrest 38 secured to the rear end of the side support members 35.

As best shown in FIGS. 2, 3, 5 and 7 the seat assembly 12 is rockable connected to the frame assembly 11 by means of the rocking assembly 15. The rocking assembly 15 lies directly beneath the seat assembly 11 and includes first and second rigid strap members 43 and 44. The members 43 and 44 are generally of the same figuration in construction but are arranged in an opposite orientation to one another. The first strap portion 43 has a central section 45 and a pair of integral downwardly extending legs 46 that attach to the horizontal members 22 of the frame assembly 11. The second strap member 44 has a central portion 47 and upwardly extending legs 48 that are attached to the side members 35 of the seat assembly 12.

The central sections 45 and 47 of the straps 43 and 44 lie in approximately the same plane and are connected together by two leaf springs 49 attached to the sections 45 and 47 as by bolts 50 or other such attachment means. The springs 49 are of a pultrusion, fiber glass composition such as are available from Glassforms, Inc. of San Jose, Calif. Although two springs 49 are preferred for attaching the straps 43 and 44 together, it is possible that only one spring 49 could be used if it was sufficiently wide, and of course, more than two springs 49 can also be employed.

The specific composition of the leaf springs 49 will vary depending upon the weight range of the persons using the chair. Preferably, the leaf springs should have a composition that will allow approximately one and one-half inches of deflection of the seat assembly 12 with respect to the frame assembly 11 to provide a comfortable and controlled rocking motion of the assembly 12. Thus, the rocking assembly 15 provides a durable and yet generally simplistic construction that permits the seat assembly 12 to rock with respect to the frame assembly 11.

Preferably, the wheelchair 10 includes a brake and seat lock assembly 53 on each side member 18 and 19 as shown in FIGS. 4, 5, 6 and 7 that serve to fix the seat assembly 12 in a horizontal alignment with the frame assembly 11 and unbrakes the main wheels 13 when a user desires, as during travel of the chair 10. Conversely, when the user desires to rock in the chair 10, the brake assemblies 53 unlock the seat assembly 12 for rocking and apply a braking force on the main wheels 13 to inhibit movement of the chair 10.

Figure 4:
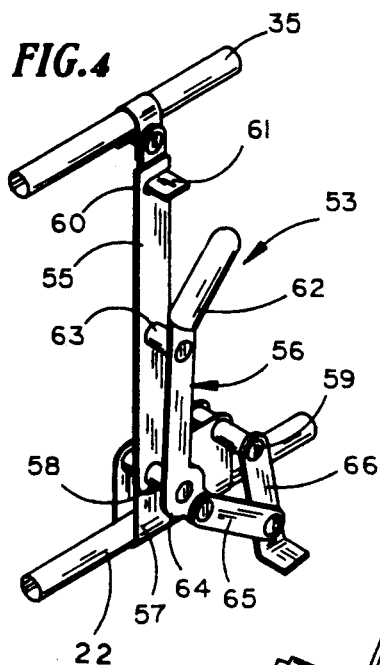
FIG. 4 is an enlarged fragmentary view of a brake and seat lock assembly that forms part of the present invention and is shown in its locked condition.
Figure 6:
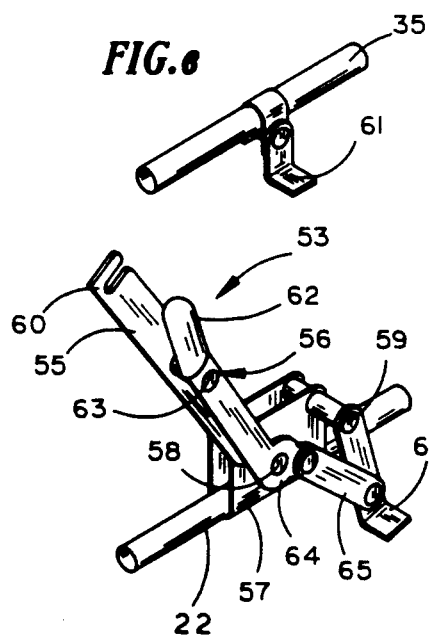
FIG. 6 is a fragmentary view similar to that of FIG. 4 but showing the brake and seat lock assembly in an unlocked condition.

Referring now to FIGS. 4 and 6, one of the assemblies 53 is shown respectively in its locked and unlocked positions. Preferably, the assembly 53 is formed of a seat lock lever 55 and a wheel brake lever unit 56 that move in unison with one another. The seat lock lever 55 and brake lever unit 56 are attached to the horizontal members 22 and 23, as indicated in FIG. 4 by a U-shaped bracket 57 and pins 58 and 59 that serve as axles. The lever 55 is pivotally mounted at its lower end to the pin 58 and has an upper hook end 60 for engaging a lug type catch member 61 secured on one of the upper horizontal members 22. Thus, when the lock level 55 is engaged with the catch member 61, the seat assembly 12 is prevented from rocking and is maintained preferably in a generally horizontal alignment with respect to the frame assembly 11.

Figure 7:
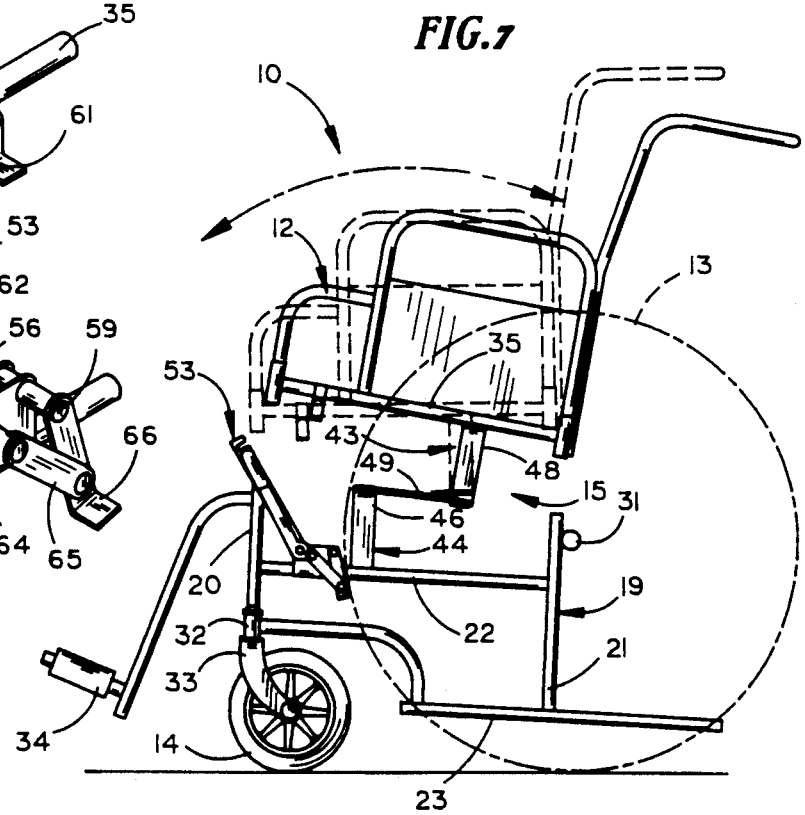
FIG. 7 is a side view similar to that of FIG. 5 to illustrate rockable movement of the seat portion with respect to the frame assembly.

The brake lever unit 56 includes a control lever 62 attached at its upper portion by a pin 63 to the lock lever 55. At its lower end, the lever 62 has a bell crank portion 64 that is attached to a link 65 that connects the control lever 62 to a wheel brake 66. The upper end of the wheel brake 66 is attached to the bracket 57 by the pin 59. As indicated by FIGS. 6 and 7, when the lock lever 55 is disengaged from the catch 61 by moving it forwardly, such action causes the brake 66 to move in a rearward direction to abut against and act to stop movement of the main wheels 13.

Thus, the present invention provides a unique and improved rocking wheelchair that provides, when desired, a comfortable support for a user comparable to that of a normal rocking chair. The chair may be used by persons of all ages (except for the very young) to provide a pleasant and controlled rocking action. Due to the rocking assembly between the frame assembly 11 and the seat assembly 12, a user of the chair 10 may sit normally in the seat 11 and with very little effort expended enjoy the rocking action of the seat assembly 12 as it rocks about its rockable connection with the frame assembly 11 without any movement of the wheels 13 and 14 or the frame assembly 11.

I claim:

1. An improved wheelchair that permits a user to rock while seated in the chair, said wheelchair comprising:
   (a) a frame formed of spaced part rigid side members connected together by cross braces, each of said side members including upper and lower tubular members;
   (b) a pair of main wheels connected with said frame and at least one of which serves as a driving wheel for the chair;
   (c) at least one caster wheel pivotally connected with said frame;
   (d) a seat portion having opposite support members;
   (e) a rocking assembly for supporting said seat portion in a rockable relationship to said frame, said assembly having:
      1. a first rigid strap means attached to and extended between said upper members of said frame;
      2. a second rigid strap means attached to and extended between said support members of said seat portion;
      3. spring means connected to said first and second strap means to normally maintain said seat portion in a desired alignment when the chair is unoccupied and to permit the seat to yieldably rock with respect to said frame
   (f) at least one brake and seat lock assembly attached to said frame and which in one position concurrently locks the seat and permits the wheels to move and in an opposite position concurrently locks the wheels and permits the seat to rock.

2. An improved wheelchair as recited in claim 1 wherein said chair further comprises a brake and seat lock assembly that provides a means for controlling both the rocking motion of said seat and the rotation of said main wheels whereby when said assembly is in a seat lock position, said seat is held in a fixed position with respect to said frame and said main wheels are free to rotate allowing said chair to be mobile.

3. An improved wheelchair as recited in claim 1 wherein said seat portion has a seat member, armrest means on opposite sides of said seat member, and backrest means that forms a rear portion of said seat portion, which seat member, armrest means and a backrest means all are in a unitary construction whereby they move in unison.

4. An improved wheelchair as recited in claim 1 wherein said spring means is at least one leaf spring.

5. An improved wheelchair as recited in claim 1 wherein said seat portion includes a non-rigid seat platform.

6. An improved wheelchair that permits a user to rock while seated in the chair, said wheelchair comprising:
   (a) a frame formed of spaced part rigid side members connected together by cross braces, each of said side members including upper and lower tubular members;
   (b) a pair of main wheels connected with said frame and at least one of which serves as a driving wheel for the chair;
   (c) at least one caster wheel pivotally connected with said frame;
   (d) a seat portion having opposite support members;
   (e) a rocking assembly for supporting said seat portion in a rockable relationship to said frame, said assembly having:
      1. a first rigid strap means attached to and extended between said upper members of said frame and having an upper central portion;
      2. a second rigid strap means attached to and extended between said support members of said seat portion and having a lower central portion;
      3. a spring means connected to said first and rear strap means to normally maintain said seat portion in a desired alignment when the chair is unoccupied and to permit the seat to yieldably rock with respect to said frame; and
      4. said spring means located between and attached to said upper central section of said front strap means and said lower central section of said rear strap means
   (f) at least one brake and seat lock assembly attached to said frame and which in one position concurrently locks the seat and permits the wheels to move and in an opposite position concurrently locks the wheels and permits the seat to rock.

7. An improved wheelchair that permits a user to rock while seated in the chair, said wheelchair comprising:
   (a) a frame formed of spaced part rigid side members connected together by cross braces, each of said side members including upper and lower tubular members;
   (b) a pair of main wheels connected with said frame and at least one of which serves as a driving wheel for the chair;
   (c) at least one caster wheel pivotally connected with said frame;
   (d) a seat portion having opposite support members;
   (e) a rocking assembly for supporting said seat portion in a rockable relationship to said frame, said assembly having:
      1. a first rigid strap means attached to and extended between said upper members of said frame;
      2. a rear rigid strap means transversely attached to and extended between said support members of said seat portion;
      3. a spring means connected to said front and rear strap means to normally maintain said seat portion in a desired alignment when the chair is unoccupied and to permit the seat to yieldably rock with respect to said frame;
4. said front rigid strap means having an upper central portion and downwardly extending legs attached to said upper tubular members of the frame;
5. said rear rigid strap means having a lower central portion and upwardly extending legs attached to said support members of the seat portion;
6. said spring means located between and attached to said upper central section of said front strap means and said lower central section of said rear strap means;

(f) at least one brake and seat lock assembly attached to said frame and which in one position concurrently locks the seat and permits the wheels to move and in an opposite position concurrently locks the wheels and permits the seat to rock.

8. An improved wheelchair as recited in claim 7 wherein said brake and seat lock assembly comprises:
   (a) a control lever attached to a wheel brake lever;
   (b) a seat lock lever which is adjacent and connected to said wheel brake lever;
   (c) a wheel brake which is pivotally connected to said wheel brake lever;
   (d) an upper hook end located at the top of said seat lock lever; and
   (e) a lug type catch secured to said seat assembly.

9. An improved wheelchair is recited in claim 8 wherein said control lever may be pulled backward to concurrently lock said seat by mating said upper hook end with the lug type catch and free one of said main wheels by disengaging said wheel brake from said wheel and said control lever may also be pushed forward to concurrently free said seat by disengaging said upper hook end from said lug type catch and lock said wheel by forcing said wheel brake into contact with said one main wheel.

* * * * *